United States Patent Office 2,842,570
Patented July 8, 1958

2,842,570

11β,17β-DIHYDROXY-17α-METHYLANDROSTANE-3-ONES

Milton E. Herr, Kalamazoo, Mich., assignor to The Upjohn Company, Kalamazoo, Mich., a corporation of Michigan No Drawing. Application December 5, 1955
Serial No. 550,845

5 Claims. (Cl. 260—397.45)

This invention pertains to organic compounds of the androstane series and is more particularly concerned with novel 11β,17β-dihydroxy-17α-methylandrostane-3-ones of the formula

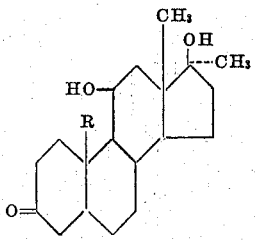

wherein R is selected from hydrogen and methyl. The configuration of the 5-hydrogen atom can be α or β and both forms are included within the scope of the present invention.

It is an object of this invention to provide the 11β,17β-dihydroxy-17α-methylandrostane-3-ones of the above formula. Said compounds are potent anabolic and androgenic agents and are useful in place of prior anabolic and androgenic agents in known anabolic and androgenic pharmaceutical preparations. The compounds also are anti-pituitary agents and can be employed in place of known anti-pituitary agents in pharmaceutical formulations used for this purpose. Other objects and uses will be apparent to one skilled in the art.

The 11β,17β-dihydroxy-17α-methylandrostane-3-ones of the above formula are also useful in the form of their 17-monoacylate or 11,17-diacylate. Their acylates, e. g., mono- or di-acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 11β,17β-dihydroxy-17α-methylandrostane-3-ones.

The 11β,17β-dihydroxy-17α-methylandrostane-3-ones of the present invention can be prepared readily from the corresponding 11β-hydroxy-17α-methyltestosterones (starting compounds are described in U. S. Patent 2,735,854, filed March 11, 1955) by hydrogenation of the 4-double bond. The hydrogenation can be carried out by catalytic methods, preferably with hydrogen and a palladium catalyst, and preferably using a solvent, e. g., an alcohol such as ethyl alcohol. The 11β,17β-dihydroxy-17α-alkylandrostane-3-ones and 11β,17β-dihydroxy-17α-alkyl-19-norandrostane-3-ones wherein the alkyl radical is preferably a lower-alkyl radical containing from two to eight carbon atoms, inclusive, e. g., ethyl (particularly preferred), propyl, isopropyl, butyl, secondary butyl, amyl, hexyl, heptyl, octyl, etc., are prepared by the same methods and have similar androgenic, anti-pituitary and anabolic activity.

The following examples are illustrative of certain preferred processes and products and are not to be construed as limiting the invention.

Example 1.—A solution of one gram of 11β-hydroxy 17α-methyltestosterone in 25 milliliters of 95 percent ethyl alcohol is prepared and 100 milligrams of five per cent palladium on charcoal catalyst is added. The mix ture is then shaken with hydrogen under a pressure of about 25 pounds per square inch for several minutes when one molar equivalent of hydrogen is reacted. The hydrogenated mixture is then filtered to remove the catalyst and the filtrate evaporated to dryness in vacuo. About 25 milliliters of dry benzene is then added to the residue and the resulting mixture again evaporated to dryness thereby removing last traces of water and alcohol. The residue is then dissolved in twenty milliliters of methylene chloride, the solution diluted with twenty milliliters of benzene, and the solution evaporated until the methylene chloride is removed and the solid product begins to separate. After standing for sixteen hours at room temperature, the precipitate is separated by filtration, washed with benzene (the benzene filtrate and washings being preserved), and dried to provide 0.379 gram of 11β,17β-dihydroxy-17α-methyl-5α-androstane-3-one melting at 23 to 244 degrees centigrade. Recrystallization of this product from benzene gave a melting point 250 degrees centigrade (Fisher-Johns block), $[\alpha]_D^{24}$ of plus 23 degrees in chloroform.

Analysis.—Calcd. for $C_{20}H_{32}O_3$: C, 74.94; H, 10.03. Found: C, 74.87; H, 10.21.

The foregoing benzene filtrate and washings are concentrated to dryness in vacuo providing 0.620 gram of residue. This residue is dissolved in fifty milliliters of acetone and chromatographed on a column containing fifty grams of a mixture containing two parts of diatomaceous earth (Celite) and one part of activated charcoal (Darco G–60). Eluting with 800 milliliters of acetone provides 0.502 gram of 11β,17β-dihydroxy-17α-methyl 5β-androstane-3-one which, after crystallization from mixture of methylene chloride and normal hexane (Skellysolve B), melts at 182 to 184 degrees centigrade (Fisher-Johns block) and has $[\alpha]_D^{24}$ of plus 32 degrees in chloroform.

Analysis.—Calcd. for $C_{20}H_{32}O_3$: C, 74.94; H, 10.03. Found: C, 75.25; H, 9.89.

The foregoing chromatographic column is finally eluted with 400 milliliters of methylene chloride and the eluate evaporated to dryness to provide an additional 0.047 gram of 11β,17β-dihydroxy-17α-methyl-5α-androstane-3-one.

Example 2.—In exactly the same manner as shown in Example 1, hydrogenation of 11β-hydroxy-17α-methyl-19 nortestosterone with hydrogen and a palladium-charcoal catalyst provides 11β,17β-dihydroxy-17α-methyl-19-nor 5α-androstane-3-one and 11β,17β-dihydroxy-17α-methyl 19-nor-5β-androstane-3-one. Other 11β,17β-dihydroxy 17α-alkyl-5α(and 5β)-androstane-3-ones and 11β,17β-dihydroxy-17α-alkyl-19-nor-5α(and 5β)-androstane-3-one wherein the alkyl radical is as defined and illustrated above, are prepared by the same procedure from corresponding 11β-hydroxy-17α-alkyltestosterones and 11β hydroxy-17α-alkyl-19-nortestosterones.

Example 3.—A solution of 11β,17β-dihydroxy-17α methyl-5α-androstane-3-one in dry pyridine is treated with acetic anhydride, the molar ratio of steroid to acetic anhydride being about one to three, and the resulting mixture is heated under reflux for about six hours. The mixture is then cooled, diluted with water while stirring, and the solid precipitate obtained removed by filtration. The solid is washed with two percent aqueous hydrochloric acid solution and with water, and then dried under vacuum. Recrystallization or chromatographic separation provides purified 11β,17β-dihydroxy - 17α - methyl-5α-androstane-3-one 17-acetate. In exactly the same manner 11β,17β-dihydroxy-17α-methyl-5β-androstane - 3 - one 17-acetate, 11β,17β - dihydroxy-17α-methyl - 19 - nor-5α-androstane-3-one 17-acetate and 11β,17β-dihydroxy-17α-methyl-19-nor-5β-androstane - 3 - one 17-acetate are obtained by used 11β,17β-dihydroxy - 17α - methyl-5β-androstane-3-one, 11β,17β-dihydroxy-17α-methyl - 19 - nor-5α-androstane-3-one and 11β,17β-dihydroxy-17α-methyl-19-nor-5β-androstane-3-one, respectively, as the starting steroid in the foregoing procedure. Substituting the appropriate acylating agent, i. e., the appropriate acid, acid anhydride or acid chloride, for the acetic anhydride in the above process provides other 17-acylates of 11β,17β-dihydroxy-17α-methyl-5α(and 5β)-androstane - 3 - one and 11β,17β - dihydroxy-17α-methyl - 19 - nor-5α(and 5β)-androstane-3-one including the 17-formate, propionate, trimethylacetate, furoate, α or β-cyclohexylpropionate, benzoate, phenylacetate, α or β-cyclopentylpropionate, α or β-phenylpropionate, methylbenzoate, α or β-furylacrylate, valerate, methacrylate, and the like.

*Example 4.*—A mixture of 11β,17β-dihydroxy-17α-methyl-5α-androstane-3-one 17-acetate, a large excess of acetic anhydride to serve as both acylating agent and solvent, and a trace of the strongly acidic catalyst sulfuric acid is heated at a temperature of about one hundred degrees centigrade for twelve hours. The hot solution then is poured over cracked ice and the resulting mixture stirred until hydrolysis of the excess acetic anhydride is complete. The solid product which precipitates is removed by filtration, washed with water and dried under vacuum. Purified 11β,17β-dihydroxy-17α-methyl-5α-androstane-3-one 11,17-diacetate is obtained by recrystallization or chromatographic separation. 11β,17β-dihydroxy-17α-methyl-5β-androstane-3-one 11,17-diacetate is obtained in exactly the same manner by substituting 11β,17β-dihydroxy-17α-methyl-5β-androstane - 3 - one for the above starting steroid. By substituting the appropriate acylating agent, i. e., the appropriate acid anhydride or isopropenyl acylate, in the above procedure other 11,17-diacylates of 11β,17β-dihydroxy-17α-methyl-5α(and 5β)-androstane-3-one and 11β,17β-dihydroxy-17α-methyl-19-nor-5α(and 5β)-androstane-3-one are obtained including the 11,17-dipropionate, diacetate, di-(trimethylacetate), difuroate, di-(α or β-cyclohexylpropionate), dibenzoate, di-(phenylacetate), di-(α or β-cyclopentylpropionate), di-(α or β-phenylpropionate), di-(methylbenzoates), di-(α or β-furylacrylates), divalerate, di-(methacrylate), 11-acetate 17-formate, 11-(β-cyclopentylpropionate) 17-acetate, and the like. The foregoing 17-acylates and 11,17-diacylates can also be prepared by hydrogenation, according to the procedures of Examples 1 and 2, of corresponding 17-acylates and 11,17-diacylates of 11β-hydroxy-17α-methyltestosterone and 11β-hydroxy-17α-methyl-19-nortestosterone. The 17-monoacylates and 11,17-diacylates of other 11β,17β-dihydroxy - 17α - alkyl-5α(and 5β)-androstane-3-ones and 11β,17β-dihydroxy-17α-alkyl-19-nor-5α (and 5β)-androstane-3-ones, wherein the alkyl and acylate radicals are as defined and illustrated above, also are prepared by the the foregoing procedures.

I claim:

1. 11β,17β-dihydroxy-17α-methylandrostane - 3 - one of the formula

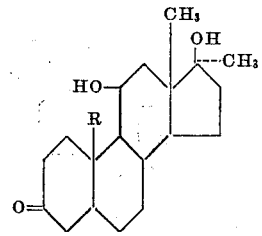

wherein R is selected from the group consisting of hydrogen and methyl.

2. 11β,17β-dihydroxy-17α-methyl-5α-androstane-3-one.
3. 11β,17β-dihydroxy-17α-methyl-19 - nor - 5α-androstane-3-one.
4. 11β,17β-dihydroxy-17α-methyl-5β-androstane-3-one.
5. 11β,17β-dihydroxy-17α-methyl-19 - nor - 5β-androstane-3-one.

References Cited in the file of this patent

UNITED STATES PATENTS 2,695,907    Murray et al. _____ Nov. 30, 1954